J. F. FERGUSON.
Evaporating-Pan.

No. 159,661. Patented Feb. 9, 1875.

WITNESSES
Henry N. Miller
C. L. Evert.

INVENTOR
James F. Ferguson.
per
Alexander Mason
ATTORNEYS

UNITED STATES PATENT OFFICE.

JAMES F. FERGUSON, OF ESSEX, VERMONT.

IMPROVEMENT IN EVAPORATING-PANS.

Specification forming part of Letters Patent No. 159,661, dated February 9, 1875; application filed January 9, 1875.

*To all whom it may concern:*

Be it known that I, JAMES F. FERGUSON, of Essex, in the county of Chittenden and in the State of Vermont, have invented certain new and useful Improvements in Evaporators for Saccharine Liquids; and do hereby declare that the following is a full, clear, and exact description thereof, reference being had to the accompanying drawings and to the letters of reference marked thereon, making a part of this specification.

The nature of my invention consists in the construction and arrangement of an apparatus for evaporating saccharine liquids, as will be hereinafter more fully set forth.

In order to enable others skilled in the art to which my invention appertains to make and use the same, I will now proceed to describe its construction and operation, referring to the annexed drawing, in which—

Figure 1:
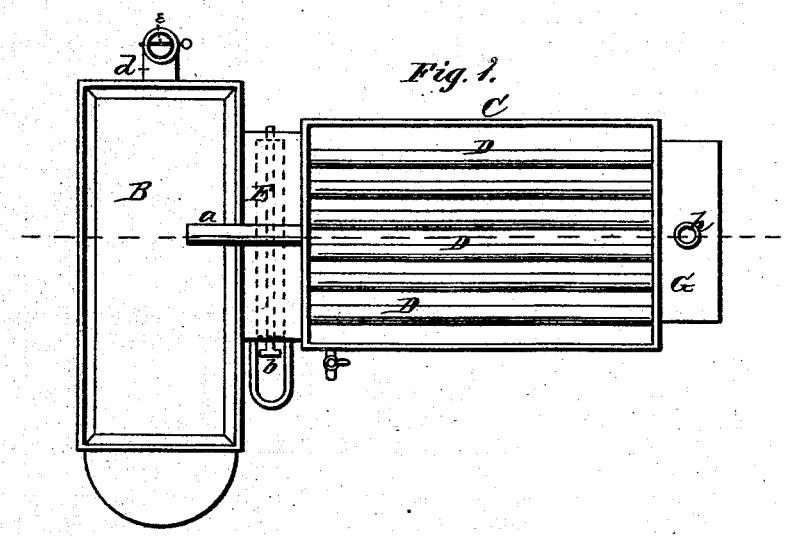
Figure 2:
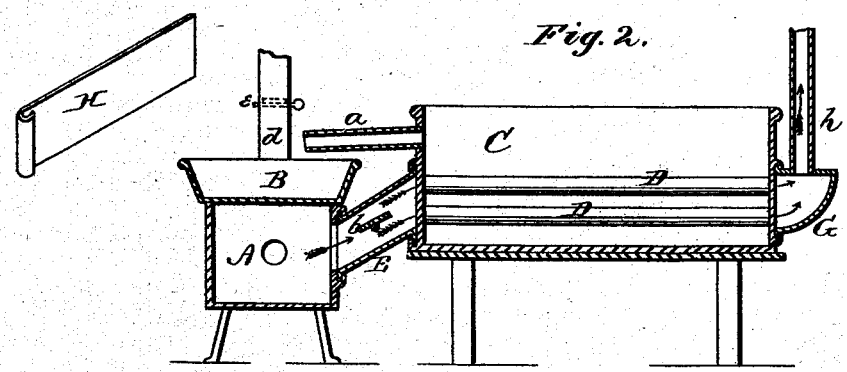

Figure 1 is a plan view of my evaporating apparatus, and Fig. 2 is a longitudinal vertical section of the same.

A represents a fire-box, of any suitable construction and dimensions, on top of which is placed a pan, B, to be used in boiling, sirup-ing-off, and sugaring-off. The pan B forms the cover for the fire-box, and may project over the sides and ends thereof any desired distance. C represents another pan, provided with a number of flues or tubes, D D, running longitudinally through the same. This pan is connected at one end with the fire-box A by a movable flue, E, covering the ends of all the flues D at that end of the pan; and the flue E is inclined at such an angle as to elevate the pan C sufficiently to discharge into and feed the pan B through the pipe *a*. The inclined movable flue E is provided with a damper, *b*, as shown in Fig. 2.

By removing the flue E, the pan C is entirely separated from the fire with the greatest ease, though it may be filled with sirup. A slide, H, is then inserted, so as to close the opening in the fire-box, and the smoke is then carried off at the end of the fire-box through a pipe, *d*, arranged for that purpose. But when the apparatus is in full operation, a damper, *e*, in the pipe *d* is closed; and as the fire passes through the tubes D in the pan C, and out at the other end, a flue-box, G, is so adjusted at this end as not to allow the heat to occupy any more of the end of the pan than at the other end, or than will be covered with flues inside. From the flue-box G the smoke passes out through a pipe, *h*.

The apparatus thus constructed is cheap and economical, there being no need for the expensive arch which is used in other evaporators. It is easily managed, can be moved at pleasure and with ease, and requires but comparatively little fuel.

The pan C is, of course, to be supported upon a table or other suitable support.

Having thus fully described my invention, what I claim as new, and desire to secure by Letters Patent, is—

1. The inclined movable flue E, connecting the fire-box A with the pan C, substantially as and for the purposes herein set forth.

2. The combination of the fire-box A, pan B, pan C, with flues D, and the movable inclined flue E, substantially as and for the purposes herein set forth.

3. The combination of the fire-box A, pan B, inclined flue E, with damper *b*, pan C, with pipe *a* and flues D, flue-box G, and smoke-pipe *h*, all constructed substantially as and for the purposes set forth.

In testimony that I claim the foregoing I have hereunto set my hand and seal this 15th day of December, 1874.

JAMES F. FERGUSON. [L. S.]

Witnesses:
F. D. FERGUSON,
C. J. FERGUSON.